United States Patent
Wang et al.

(10) Patent No.: US 12,512,238 B2
(45) Date of Patent: Dec. 30, 2025

(54) IRON-BASED NANOPARTICLES AND GRAINS

(71) Applicant: REGENTS OF THE UNIVERSITY OF MINNESOTA, Minneapolis, MN (US)

(72) Inventors: Jian-Ping Wang, Shoreview, MN (US); Bin Ma, Roseville, MN (US); Jinming Liu, Minneapolis, MN (US); Yiming Wu, Shoreview, MN (US); Yanfeng Jiang, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 0 days.

(21) Appl. No.: 18/494,838

(22) Filed: Oct. 26, 2023

(65) Prior Publication Data
US 2024/0055165 A1  Feb. 15, 2024

Related U.S. Application Data

(63) Continuation of application No. 17/490,800, filed on Sep. 30, 2021, now Pat. No. 11,837,393, which is a (Continued)

(51) Int. Cl.
*H01F 1/06* (2006.01)
*B22F 1/054* (2022.01)
(Continued)

(52) U.S. Cl.
CPC .............. *H01F 1/065* (2013.01); *B22F 1/054* (2022.01); *B22F 1/0553* (2022.01); *B22F 1/06* (2022.01);
(Continued)

(58) Field of Classification Search
None
See application file for complete search history.

(56) References Cited

U.S. PATENT DOCUMENTS

| 9,378,876 B2 | 6/2016 | Takahashi et al. |
| 2008/0014442 A1 | 1/2008 | Rida |

(Continued)

FOREIGN PATENT DOCUMENTS

| CN | 103328134 A | 9/2013 |
| CN | 105448450 A | 3/2016 |

(Continued)

*Primary Examiner* — Xiaobei Wang
(74) *Attorney, Agent, or Firm* — BakerHostetler

(57) ABSTRACT

Example nanoparticles may include an iron-based core, and a shell. The shell may include a non-magnetic, anti-ferromagnetic, or ferrimagnetic material. Example alloy compositions may include an iron-based grain, and a grain boundary. The grain boundary may include a non-magnetic, anti-ferromagnetic, or ferrimagnetic material. Example techniques for forming iron-based core-shell nanoparticles may include depositing a shell on an iron-based core. The depositing may include immersing the iron-based core in a salt composition for a predetermined period of time. The depositing may include milling the iron-based core with a salt composition for a predetermined period of time. Example techniques for treating a composition comprising core-shell nanoparticles may include nitriding the composition.

14 Claims, 13 Drawing Sheets

Related U.S. Application Data continuation of application No. 16/340,031, filed as application No. PCT/US2017/055531 on Oct. 6, 2017, now Pat. No. 11,161,175.

(60) Provisional application No. 62/405,661, filed on Oct. 7, 2016.

(51) Int. Cl.

| | | |
|---|---|---|
| *B22F 1/06* | (2022.01) | |
| *B22F 1/16* | (2022.01) | |
| *B22F 9/04* | (2006.01) | |
| *C22C 38/00* | (2006.01) | |
| *C22C 38/10* | (2006.01) | |
| *C23C 8/26* | (2006.01) | |
| *C23C 8/50* | (2006.01) | |
| *C23C 8/80* | (2006.01) | |
| *H01F 1/055* | (2006.01) | |
| *H01F 1/059* | (2006.01) | |

(52) U.S. Cl.
CPC ............... *B22F 1/16* (2022.01); *B22F 9/04* (2013.01); *C22C 38/00* (2013.01); *C22C 38/001* (2013.01); *C22C 38/10* (2013.01); *C23C 8/26* (2013.01); *C23C 8/50* (2013.01); *C23C 8/80* (2013.01); *H01F 1/0551* (2013.01); *H01F 1/059* (2013.01); *H01F 1/061* (2013.01); *B22F 1/0547* (2022.01); *B22F 2301/35* (2013.01); *B22F 2302/20* (2013.01); *B22F 2304/054* (2013.01); *H01F 1/0552* (2013.01)

(56) References Cited

U.S. PATENT DOCUMENTS

| | | |
|---|---|---|
| 2010/0054981 A1 | 3/2010 | Liu |
| 2010/0227202 A1 | 9/2010 | Gao et al. |
| 2010/0323219 A1 | 12/2010 | Misra |
| 2011/0240909 A1 | 10/2011 | Kanda et al. |
| 2012/0208026 A1* | 8/2012 | Zhou ............... A61K 9/0009 427/127 |
| 2014/0225024 A1 | 8/2014 | Kim et al. |
| 2014/0272447 A1 | 9/2014 | Maye et al. |
| 2014/0294657 A1* | 10/2014 | Yamamoto ............ H01F 1/083 148/230 |
| 2015/0380158 A1 | 12/2015 | Brady et al. |
| 2016/0086700 A1 | 3/2016 | Suetsuna et al. |
| 2016/0379741 A1* | 12/2016 | Allard, Jr. ............ H01F 1/047 252/62.55 |
| 2017/0186518 A1* | 6/2017 | Wang ................... C23C 14/165 |

FOREIGN PATENT DOCUMENTS

| | | |
|---|---|---|
| EP | 1662256 A1 | 5/2006 |
| JP | 2011-216838 A | 10/2011 |
| JP | 2013-254756 A | 12/2013 |
| KR | 10-1639724 B1 | 7/2016 |
| WO | 2013/026007 A2 | 2/2013 |
| WO | 2015/148810 A1 | 10/2015 |

\* cited by examiner

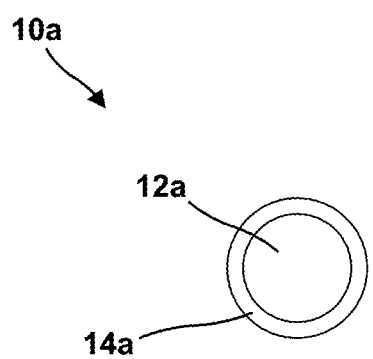
FIG. 1A
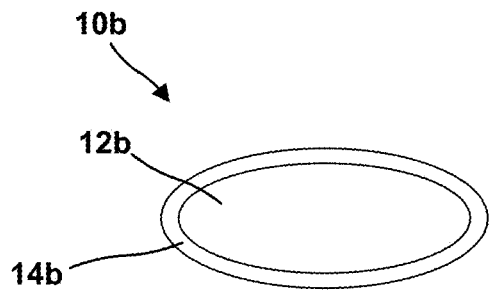
FIG. 1B
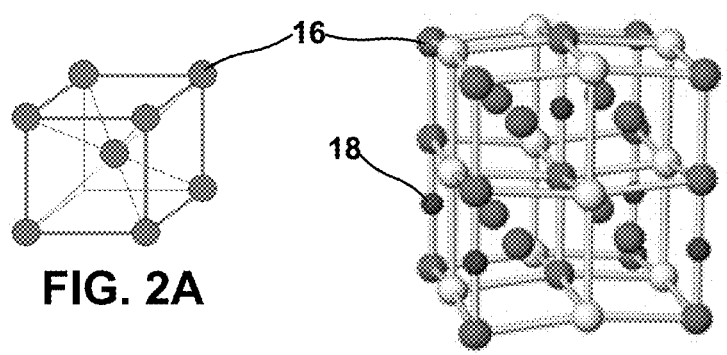
FIG. 2A
FIG. 2B
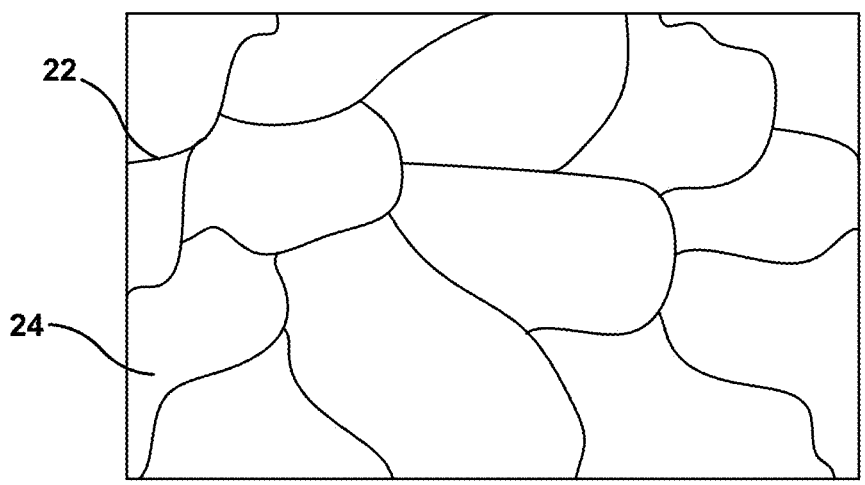
FIG. 3

IRON-BASED NANOPARTICLES AND GRAINS

CROSS REFERENCE TO RELATED APPLICATIONS

This application is a continuation of U.S. patent application Ser. No. 17/490,800, filed Sep. 30, 2021, which is a continuation of U.S. patent application Ser. No. 16/340,031, filed Apr. 5, 2019, which is a National Stage of International Patent Application No. PCT/US2017/055531, filed Oct. 6, 2017, and claims the benefit of U.S. Provisional Patent Application No. 62/405,661, filed Oct. 7, 2016, and titled "IRON-BASED NANOPARTICLES AND GRAINS," the entire contents of which are incorporated by reference herein.

GOVERNMENT INTEREST

This invention was made with Government support under contract number DE-AR0000199 awarded by the DOE, Office of ARPA-E. The government has certain rights in this invention.

TECHNICAL FIELD

The disclosure relates to iron-based nanoparticles and grains and techniques for forming iron-based nanoparticles and grains.

BACKGROUND

Permanent magnets play a role in many electromechanical systems, including, for example, alternative energy systems. For example, permanent magnets are used in sensors, actuators, electric motors or generators, which may be used in vehicles, wind turbines, and other alternative energy mechanisms. Many permanent magnets in current use include rare earth elements, such as neodymium, which result in high energy product. These rare earth elements are in relatively short supply, and may face increased prices and/or supply shortages in the future. Additionally, some permanent magnets that include rare earth elements are expensive to produce. For example, fabrication of NdFeB and ferrite magnets generally includes crushing material, compressing the material, and sintering at temperatures over 1000° C., all of which contribute to high manufacturing costs of the magnets. Additionally, the mining of rare earth can lead to severe environmental deterioration.

Iron nitride magnets based on the $Fe_{16}N_2/Fe_8N$ phase are of interest as a magnetic material for applications ranging from data storage to electrical motors for vehicles, wind turbines, and other power generation equipment. The component base elements (Fe, N) are inexpensive and widely available, in contrast to rare earth elements in rare earth element-based magnets, which are costly and subject to supply availability risks. The $Fe_{16}N_2$ phase, which is the ordered version of $Fe_8N$, has a large magnetic anisotropy constant and saturation magnetization but is difficult to manufacture.

SUMMARY

The disclosure describes example nanoparticles. In some examples, the nanoparticles may include an iron-based core, and a shell. The shell may include a non-magnetic material, an anti-ferromagnetic material, or a ferromagnetic material.

The disclosure also describes example alloy compositions. In some examples, the alloy compositions may include an iron-based grain, and a grain boundary. The grain boundary may include a non-magnetic material, an anti-ferromagnetic material, or a ferromagnetic material.

The disclosure describes example techniques for forming iron-based core-shell nanoparticles. In some examples, the core-shell nanoparticles may be formed by a technique including depositing a shell on an iron-based core by at least immersing the iron-based core in a salt composition for a predetermined period of time. The shell may include a non-magnetic material, an anti-ferromagnetic material, or a ferromagnetic material.

In some examples, the core-shell nanoparticles may be formed by a technique including depositing a shell on an iron-based core by at least milling the iron-based core with a salt composition for a predetermined period of time. The shell may include a non-magnetic material, an anti-ferromagnetic material, or a ferromagnetic material.

The disclosure describes example techniques for treating a composition comprising a core-shell nanoparticle. The core-shell nanoparticle includes an iron-based cores and a shell including a non-magnetic material, an anti-ferromagnetic material, or a ferrimagnetic material. The examples techniques include nitriding the composition. In some examples, the nitriding may include autoclaving the composition in a nitrogen-rich environment or milling the composition with a nitrogen source.

The disclosure describes example techniques for preparing a core-shell nanoparticle. The technique includes nitriding a composition comprising an iron-based core to form a shell comprising iron nitride on the iron-based core.

The disclosure describes example techniques for treating a composition comprising an iron-based material. The technique includes nitriding the composition by exposing the composition to a predetermined pressure, at a predetermined temperature, for a predetermined period of time, in an environment including a nitrogen source.

The details of one or more examples are set forth in the accompanying drawings and the description below. Other features, objects, and advantages will be apparent from the description and drawings, and from the claims.

BRIEF DESCRIPTION OF DRAWINGS

FIG. 1A is a conceptual and schematic diagram illustrating an example core-shell nanoparticle.

FIG. 1B is a conceptual and schematic diagram illustrating an example ellipsoidal core-shell nanoparticle.

FIG. 2A is a conceptual and schematic diagram illustrating a crystallographic unit cell of α-Fe.

FIG. 2B is a conceptual and schematic diagram illustrating a crystallographic unit cell of α"-$Fe_{16}N_2$.

FIG. 3 is a conceptual and schematic diagram illustrating a microstructure including grains and grain boundaries of an example alloy composition.

DETAILED DESCRIPTION

Figure 4:
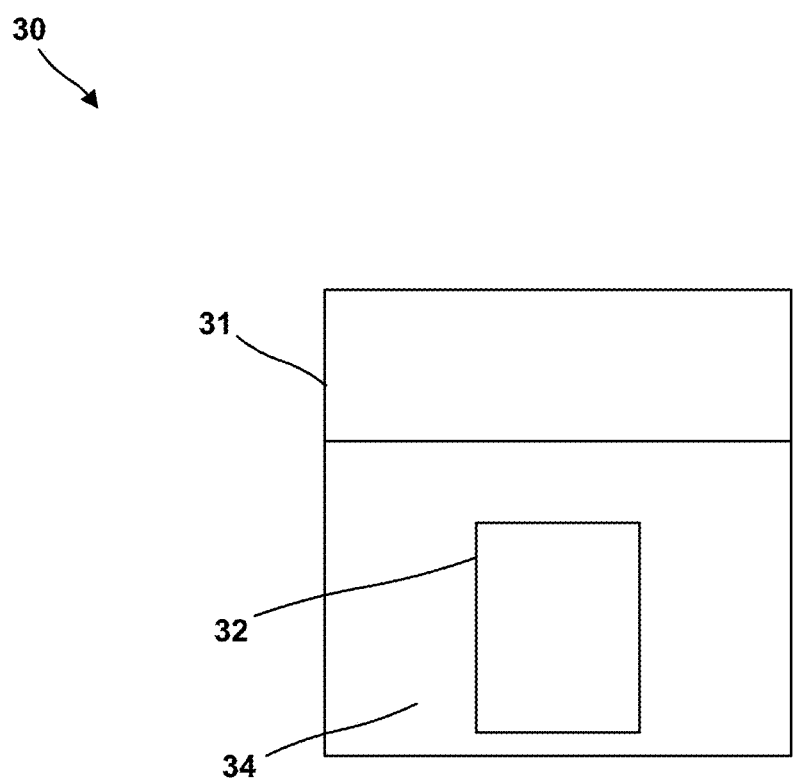
FIG. 4 is a conceptual and schematic diagram illustrating an example immersion system for forming a core-shell nanoparticle by treatment of a core nanoparticle with a salt composition.

The disclosure describes core-shell nanoparticles including an iron-based core (for example, comprising elemental iron, an iron and nitrogen alloy or compound, an iron and cobalt alloy or compound, or the like), and a shell including a non-magnetic material, an anti-ferromagnetic material, or a ferrimagnetic material, and techniques for preparing core-shell nanoparticles.

Ferromagnetic materials include materials in which magnetic domains are alignable into a substantially unidirectional alignment that persists in the absence of an applied or external magnetic field. Anti-ferromagnetic materials include materials that include substantially equal amounts of domains that are anti-parallel, canceling the net magnetic moment to zero. Ferrimagnetic materials include materials that include anti-parallel domains, yet retain a net magnetic moment because a subset of domains has a greater magnetic moment than the rest of the domains. Non-magnetic, or non-ferromagnetic materials include materials that cannot be magnetized whether in the presence or absence of an applied magnetic field.

Example core-shell nanoparticles according to the disclosure may be used to prepare bulk magnetic materials, such as bulk permanent magnets. For example, core-shell nanoparticles described herein may be used in, for example, bonding magnets, pressed magnets, other bulk magnets that include or do not include binder material, or the like. Without being bound by theory, coercivity is an extrinsic property of a magnetic material, and is related to the microstructure. Therefore, the microstructure, for example, grain sizes, phases, and grain boundaries, may influence coercivity of a material. For example, shells on nanoparticle cores may increase the coercivity of compositions that include the nanoparticles by reducing the packing density of the nanoparticles or by increasing the grain separation or grain boundary thickness in a material that includes the core-shell nanoparticles.

Without being bound by theory, three types of anisotropy may contribute to the magnetic anisotropy energy or magnetic anisotropy field. These three types of anisotropy include strain anisotropy, magnetocrystalline anisotropy, and shape anisotropy. Strain anisotropy may be related to strain exerted on iron-based magnetic materials, for example, materials including an iron nitride phase such as an $\alpha''$-$Fe_{16}N_2$ phase. Differences in coefficients of thermal expansion between different phases, crystals, between cores and shells, or between grains and grain boundaries may introduce strain due to differential dimensional changes in the particles and the grains of iron or other types of iron nitride during thermal processing. For example, differences between the respective thermal expansion coefficients of the core and the shell may lead to strain (stress-induced) anisotropy. In some examples, strain anisotropy may promote the formation of magnetic phases, for example, iron nitride phases. In some examples, shells may include one or more of silicon nitride ($Si_3N_4$), aluminum nitride (AlN), or zinc oxide (ZnO) to promote strain anisotropy.

In some examples, other forms of anisotropy may be induced to increase coercivity. For example, using an anti-ferromagnetic shell may induce exchange anisotropy, a form of magnetic anisotropy, which may increase coercivity. In some examples, the difference between the respective magnetizations of the core and the shell may itself increase coercivity. For example, while the core is ferromagnetic, the shell may include a non-ferromagnetic material, a ferromagnetic magnetic material, or an anti-ferromagnetic material, and this difference may result in exchange anisotropy.

In some examples, magnetocrystalline anisotropy may result from the crystalline structure of phase domains within crystals. For example, magnetocrystalline anisotropy may be related to the distortion of a body-centered-cubic iron crystalline lattice into a body-centered-tetragonal iron-nitride crystalline lattice in an iron nitride crystal. Iron nitride, has a relatively high saturation magnetization and a relatively high energy product, for example, as high as 130 MGOe.

Shape anisotropy may be related to the shape of the nanoparticles. For example, a nanoparticle may define a longest dimension and a shortest dimension, and the differences in these dimensions may ultimately contribute to magnetic anisotropy. One or more of strain, magnetic, exchange, and shape anisotropies may be used to enhance magnetic properties, such as coercivity, of nanoparticles according to the disclosure.

The disclosure describes example techniques for preparing core-shell nanoparticles. An example technique includes depositing a shell on an iron-based core. For example, depositing the shell may include immersing the iron-based core in a salt composition for a predetermined period of time. The shell may deposit on the iron-based core from the salt composition. In some examples, depositing the shell may include milling the iron-based core with a salt composition for a predetermined period of time. The shell may deposit on the iron-based core from the salt composition. In some examples, the example techniques may include nitriding the nanoparticles, before or after the shell is deposited on the core. For example, the nanoparticles may be nitrided by autoclaving the nanoparticles at a predetermined pressure, at a predetermined temperature, for a predetermined period of time, in a nitrogen-rich environment. In some examples, the predetermined pressure may be relatively high, such as greater than about 100 atmospheres, which may increase a rate of diffusion of nitrogen into the nanoparticles and reduce a time utilized for nitriding the nanoparticles.

While nitriding may be used to treat core-shell nanoparticles, the disclosure describes example techniques in which nitriding may be used to prepare core-shell nanoparticles. For example, an example technique for preparing core-shell nanoparticles may include nitriding a composition comprising an iron-based core to form a shell comprising iron nitride on the iron-based core.

The core-shell nanoparticles, alloy compositions, and techniques described herein may be used to form bulk magnetic materials, such as bulk permanent magnets. For example, the techniques described herein for forming material comprising core-shell nanoparticles including iron nitride may be used in processes to form iron nitride bulk permanent magnets described in International Patent Application Number PCT/US2012/051382, filed on Aug. 17, 2012, and titled "IRON NITRIDE PERMANENT MAGNET AND TECHNIQUE FOR FORMING IRON NITRIDE PERMANENT MAGNET;" and International Patent Application Number PCT/US2014/015104, filed on Feb. 6, 2014, and titled "IRON NITRIDE PERMANENT MAGNET AND TECHNIQUE FOR FORMING IRON NITRIDE PERMANENT MAGNET;" and U.S. Provisional Patent Application No. 61/935,516, filed Feb. 4, 2014, and titled "IRON NITRIDE MATERIALS AND MAGNETS INCLUDING IRON NITRIDE MATERIALS," the entire contents of which are incorporated herein by reference.

Example techniques and core-shell nanoparticles according to the disclosure may be used to eventually prepare bulk permanent magnets having relatively enhanced magnetic properties such as relatively high coercivity. For example, permanent magnets prepared from example core-shell nanoparticles according to the disclosure may exhibit magnetic properties comparable to or better than those of rare-earth magnets, without including any rare-earth elements.

FIG. 1A is a conceptual and schematic diagram illustrating an example core-shell nanoparticle. Example nanoparticle 10a includes an iron-based core 12a, and a shell 14a. In some examples, iron-based core 12a may be ferromagnetic, and have a high saturation magnetization. Shell 14a may substantially coat or surround iron-based core 12a. Shell 14a may include a non-magnetic material, an antiferromagnetic material, or a ferromagnetic material. In other examples, shell 14a may include a ferromagnetic material. Without wishing to be bound by theory, the difference between one or both of the magnetization and thermal expansion coefficient of iron-based core 12a and shell 14a, and the reduction in packing density of a composition include nanoparticle 10a because of the presence of shell 14a spacing iron-based core 12a from a neighboring core, may ultimately promote a relatively increased coercivity of materials including nanoparticle 10a, compared to materials including nanoparticles without shell 14a.

In some examples, iron-based core 12a may include one or more of elemental iron, iron nitride, $\alpha"$-$Fe_{16}N_2$, or $\alpha'$-Fe(Co)(N). In some examples, the elemental iron may include an $\alpha$-Fe phase. The iron nitride may include any iron nitride, including one or more of $Fe_2N$, $Fe_3N$, $Fe_xN_{1-x}$, where x is a number greater than 0 and less than 1, $Fe_4N$, $Fe_7N_3$, $Fe_8N$, and $Fe_{16}N_2$. The $\alpha'$-Fe(Co)(N) may include an $\alpha'$-Fe phase including Co and N. In some examples, core 12a may have a major dimension between about 20 nm and about 100 nm. While nanoparticle 10a is illustrated as a spherical particle in FIG. 1A, in other examples, nanoparticle 10a may have any suitable shape. For example, nanoparticle 10a may have a spheroidal, ellipsoidal, cuboidal, polygonal, or any other suitable shape. FIG. 1B is a conceptual and schematic diagram illustrating an example ellipsoidal core-shell nanoparticle 10b. Nanoparticle 10b includes an iron-based core 12b that may have a composition substantially similar to a composition described with reference to iron-based core 12a of FIG. 1A, and a shell 14b. In some examples, iron-based core 12b may be an ellipsoid (e.g., three-dimensional or plate-like). In some examples, iron-based core 12b may be an ellipsoid with a ratio of a longitudinal diameter to a transverse diameter of at least about 2. For example, the ratio of the longitudinal diameter to the transverse diameter may be at least about 3, or about 5, or about 10. In some examples, the ratio of the longitudinal diameter to the transverse diameter may be about 2, or about 5. In some examples, nanoparticle may exhibit a shape anisotropy, for example, as a result of the ellipsoidal shape. In some examples, the shape anisotropy may contribute to increased magnetic anisotropy.

In some examples, shell 14a or 14b may include one or more of nonmagnetic materials, such as silica, aluminum oxide, silicon nitride, aluminum nitride, zinc oxide or antiferromagnetic materials, such as manganese nitride, or ferromagnetic materials, such as iron oxide, or ferromagnetic materials, such as $Fe_4N$, and $Fe_{16}N_2$. In some examples, shell 14a may have a thickness between about 1 nm and about 10 nm. For example, shell 14a may have a thickness of about 1 nm, or about 5 nm, or about 10 nm.

In some examples, iron-based cores 12a or 12b may include $Fe_{16}N_2$. In some examples, iron-based cores 12a or 12b may include an $\alpha"$-$Fe_{16}N_2$ phase. Throughout this disclosure, the terms $Fe_{16}N_2$, $\alpha"$-$Fe_{16}N_2$, $\alpha"$-$Fe_{16}N_2$ phase, and $\alpha"$-$Fe_{16}N_2$ phase domain, for example, may be used interchangeably to refer to a $\alpha"$-$Fe_{16}N_2$ phase domain within a material. The $\alpha"$-$Fe_{16}N_2$ phase may exhibit an intrinsic magnetocrystalline anisotropy, as discussed with reference to FIGS. 2A and 2B.

FIG. 2A is a conceptual and schematic diagram illustrating a unit crystallographic cell of $\alpha$-Fe. FIG. 2A shows a unit cell including iron atoms 16 in an isotropic arrangement. FIG. 2B is a conceptual and schematic diagram illustrating a unit crystallographic cell of $\alpha"$-$Fe_{16}N_2$. FIG. 2B shows eight (8) iron unit cells in a strained state with nitrogen atoms 18 in interstitial spaces between iron atoms 16 to form the $Fe_{16}N_2$ iron nitride unit cell. As shown in FIG. 2B, in the $\alpha"$-$Fe_{16}N_2$ phase, nitrogen atoms 18 are aligned along the (002) (iron) crystal planes. The iron nitride unit cell is distorted such that the length of the unit cell along the <001> axis is approximately 6.28 angstroms (Å) while the length of the unit cell along the <010> and <100> axes is approximately 5.72 Å. The $\alpha"$-$Fe_{16}N_2$ unit cell may be referred to as a body-centered tetragonal unit cell when in the strained state. When the $\alpha"$-$Fe_{16}N_2$ unit cell is in the strained state, the <001> axis may be referred to as the c-axis of the unit cell. The c-axis may be the magnetic easy axis of the $\alpha"$-$Fe_{16}N_2$ unit cell. In other words, $\alpha"$-$Fe_{16}N_2$ crystals exhibit magnetic anisotropy. In some examples, core-shell nanoparticles 10a or 10b may have at least one $Fe_{16}N_2$ iron nitride crystal. In some examples, such an anisotropic particle may include a plurality of iron nitride crystals, at least some (or all) of which are $Fe_{16}N_2$ crystals.

The $\alpha"$-$Fe_{16}N_2$ phase has high saturation magnetization and magnetic anisotropy constant. The high saturation magnetization and magnetic anisotropy constants result in a magnetic energy product that may be higher than rare earth magnets. For example, experimental evidence gathered from thin film $\alpha''$-$Fe_{16}N_2$ permanent magnets suggests that bulk $Fe_{16}N_2$ permanent magnets may have desirable magnetic properties, including an energy product of as high as about 130 MegaGauss*Oerstads (MGOe), which is about two times the energy product of NdFeB (which has an energy product of about 60 MGOe). Additionally, iron and nitrogen are abundant elements, and thus are relatively inexpensive and easy to procure.

In some examples, nanoparticles 10a or 10b may have a relatively high coercivity. For example, nanoparticles 10a or 10b may have a coercivity of at least about 600 Oe. In some examples, nanoparticles 10a or 10b may have a coercivity of at least about 1000 Oe. For example, nanoparticles 10a or 10b may have a coercivity of about 1000 Oe.

In some examples, nanoparticles 10a or 10b may include at least one of FeN, $Fe_2N$ (e.g., $\xi$-$Fe_2N$), $Fe_3N$ (e.g., $\varepsilon$-$Fe_3N$), $Fe_4N$ (e.g., $\gamma'$-$Fe_4N$), $Fe_2N_6$, $Fe_8N$, $Fe_{16}N_2$ (e.g., $\alpha''$-$Fe_{16}N_2$), or $FeN_x$ (where x is between about 0.05 and about 0.5). Additionally, in some examples, the nanoparticles 10a or 10b may include other materials, such as elemental iron, cobalt, nickel, dopants, or the like. In some examples, the cobalt, nickel, dopants, or the like may be at least partially removed after the milling process using one or more suitable techniques. Dopants within the nanoparticles may include, for example, at least one of aluminum (Al), manganese (Mn), lanthanum (La), chromium (Cr), cobalt (Co), titanium (Ti), nickel (Ni), zinc (Zn), a rare earth metal, boron (B), carbon (C), phosphorous (P), silicon (Si), or oxygen (O).

Compositions, for example, mixtures, including example nanoparticles 10a or 10b may be compacted and shaped or otherwise further processed to form bulk magnetic materials, such as permanent magnets. For example, example alloy compositions may include nanoparticles 10a or 10b. FIG. 3 is a conceptual and schematic diagram illustrating a microstructure of an example alloy composition 20 including grain boundaries 22 between iron-based grains 24. In some examples, iron-based grains 24 include material substantially similar to that of iron-based cores 12a or 12b described with reference to FIGS. 1A and 1B. In some examples, grain boundaries 22 include material substantially similar to that of shells 14a and 14B described with reference to FIGS. 1A and 1B. In some examples, example alloy composition 20 may be prepared by compacting one or both of nanoparticles 10a or 10b. In other examples, alloy composition 20 may be prepared by any suitable techniques for engineering the compositions or phase constitutions of grains and grain boundaries, or the microstructure of alloy composition 20, including for example, casting, annealing, and nitriding. In some examples, alloy composition 20 may be further processed, for example, by one or more of molding, compacting, pressurizing, or annealing, to prepare bulk magnetic materials, such as permanent magnets. Thus, example core-shell nanoparticles and example alloy compositions according to the disclosure may be used to prepare bulk magnetic materials, such as permanent magnets.

Example systems and techniques described with reference to FIGS. 4-8 may be used to prepare example core-shell nanoparticles according to the disclosure. FIG. 4 is a conceptual and schematic diagram illustrating an example system 30 for forming a core-shell nanoparticle by treatment of a core nanoparticle with a salt composition 34. System 30 may include a container 31. Container 31 can be any suitable rigid, semi-rigid, or flexible container dimensioned to contain a sample holder 32 and salt composition 34. Sample holder 32 holds a composition including iron-based core 12a or 12b. For example, iron-based core 12a or 12b includes one or more of iron, iron nitride, $\alpha''$-$Fe_{16}N_2$, or $\alpha'$-Fe(Co)(N). In some examples, salt composition 34 includes one or more precursors of at least one of silica, aluminum oxide, silicon nitride, aluminum nitride, manganese nitride, zinc oxide, iron oxide, ferromanganese, $Fe_4N$, or $Fe_{16}N_2$. For example, salt composition 34 may include one or more of a liquid, a solution, a polymer, or a gel. The salt composition 34 deposits shell 14a or 14b on core 12a or 12b, when core 12a or 12b is immersed in salt composition 34 for a predetermined amount of time. In some examples, instead of a container 31, system 30 may spray, coat, or otherwise immerse sample holder 32 in a static batch or a moving flow of salt composition 34.

Figure 5:
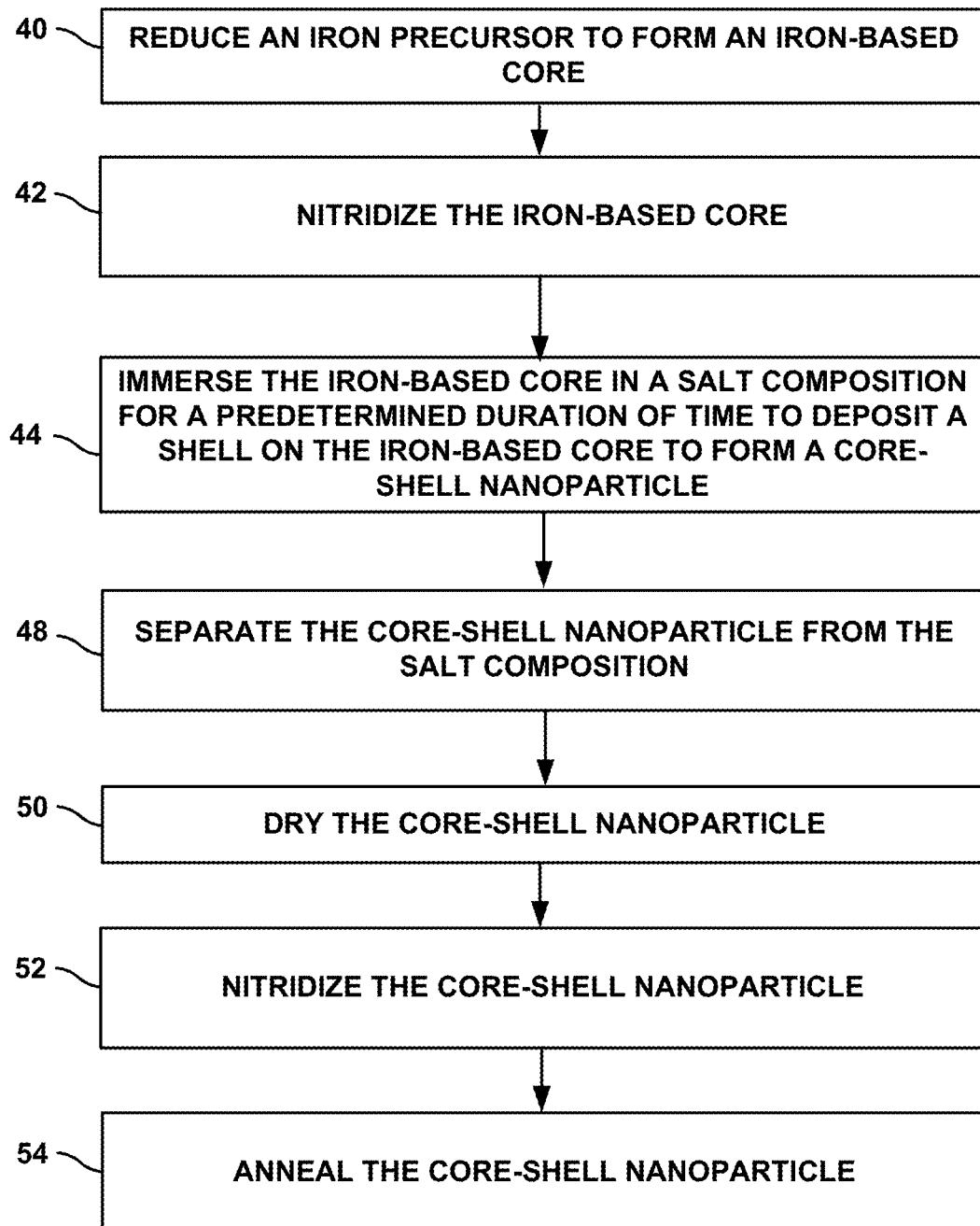
FIG. 5 is a flow diagram illustrating an example technique for forming a core-shell nanoparticle by treating a core nanoparticle with a salt composition.

FIG. 5 is a flow diagram illustrating an example technique for forming a core-shell nanoparticle by treating iron-based core 12a or 12b with salt composition 34. The example technique of FIG. 5 is described with reference to system 30 of FIG. 4. However, the example technique of FIG. 5 may be implemented using any suitable system.

In some examples, the example technique of FIG. 5 may optionally include reducing an iron precursor to form iron-based cores 12a or 12b (40). In some examples, the iron precursor may include, for example, at least one of iron (Fe), $FeCl_3$, $Fe_2O_3$, or $Fe_3O_4$. In some examples, the iron precursor may include a bulk or powder sample including Fe, $FeCl_3$, or iron (e.g., $Fe_2O_3$ or $Fe_3O_4$), or combinations thereof. In some examples, the precursor may include a powder including particles.

Reducing the precursor may include reducing or removing oxygen content in the precursor. For example, an oxygen reduction process can be carried out by exposing the precursor to hydrogen gas. The hydrogen may react with any oxygen present in the precursor, removing oxygen. In some examples, such a reduction step may form substantially pure iron within the precursor including iron (e.g., iron with less than about 10 at. % dopants). Additionally, or alternatively, reducing the precursor may include using an acid cleaning technique. For example, diluted hydrochloric acid, with a concentration between about 5% by volume and about 50% by volume can be used to wash oxygen from the precursor to form iron-based core 12a or 12b.

In some examples, the example technique of FIG. 5 may optionally include nitriding iron-based core 12a or 12b (42). Nitriding iron-based core 12a or 12b (42) may form an iron nitride phase in iron-based core 12a or 12b, and may proceed in any one of a number of manners. In general, nitrogen from a nitrogen source is combined with iron to form iron nitride. Such a nitrogen source may be the same as or similar to nitrogen sources described in elsewhere in this disclosure, such as at least one of ammonia, ammonium nitrate, an amide-containing material, or a hydrazine-containing material.

In some examples, nitriding iron-based core 12a or 12b 42 may include heating iron-based core 12a or 12b to a selected temperature for a time sufficient to allow diffusion of nitrogen to a predetermined concentration substantially throughout a volume including iron. In this manner, the heating time and temperature are related, and may also be affected by the composition and/or geometry of the volume including iron. For example, the heating may include heating to a temperature between about 125° C. and about 600° C. for between about 2 hours and about 9 hours.

In addition to heating the anisotropic particle including iron, nitriding the anisotropic particle including iron may include exposing to an atomic nitrogen substance, which diffuses into the volume including iron. In some examples, the atomic nitrogen substance may be supplied as diatomic nitrogen ($N_2$), which is then separated (cracked) into individual nitrogen atoms. In other examples, the atomic nitrogen may be provided from another atomic nitrogen precursor, such as ammonia ($NH_3$). In other examples, the atomic nitrogen may be provided from urea ($CO(NH_2)_2$). The nitrogen may be supplied in a gas phase alone (e.g., substantially pure ammonia or diatomic nitrogen gas) or as a mixture with a carrier gas. In some examples, the carrier gas is argon (Ar).

In some examples, nitriding the anisotropic particle including iron may include a urea diffusion process, in which urea is utilized as a nitrogen source (e.g., rather than diatomic nitrogen or ammonia). Urea (also referred to as carbamide) is an organic compound with the chemical formula $CO(NH_2)_2$. Urea may be heated, e.g., within a furnace enclosing the anisotropic particle including iron, to generate decomposed nitrogen atoms which may diffuse into the volume including iron. In some examples, the constitution of the resulting nitrided iron material may controlled to some extent by the temperature of the diffusion process as well as the ratio (e.g., the weight ratio) of the iron-containing workpiece to urea used for the process. Further details regarding these nitriding processes (including urea diffusion) may be found in International Patent Application No. PCT/US12/51382, filed Aug. 17, 2012, the entire content of which is incorporated herein by reference.

In some examples, nitriding iron-based core 12a or 12b (42) includes autoclaving iron-based cores 12a or 12b at a predetermined pressure, at a predetermined temperature, for a predetermined period of time, in a nitrogen-rich environment, for example, using example autoclave nitriding techniques described elsewhere in the disclosure. In some examples, the predetermined pressure may be greater than about 100 atmospheres, or at least about 100 atmospheres. Without wishing to be bound by theory, diffusion of nitrogen species increases with pressure. Increasing the pressure, increases nitrogen diffusion. Using a pressure of at least about 100 atmospheres may increase the diffusion rate by at least about 10 times. Increasing the diffusion rate may promote the nitriding result, for example, for increasing the rate of iron nitride formation.

The example technique of FIG. 5 also includes depositing shell 14a or 14b on iron-based core 12a or 12b to form core-shell nanoparticle 10a or 10b (44). Depositing shell 14a or 14b on iron-based core 12a or 12b (44) may include immersing sample holder 32 including iron-based core 12a or 12b in salt composition 34 for a predetermined period of time.

In some examples, the technique of FIG. 5 may additionally include, after depositing shell 14a or 14b on iron-based core 12a or 12b (44), separating nanoparticle 10a or 10b from salt composition 34 (48). The separating may include screening or filtering, for example, through a screen or a mesh. Nanoparticles 10a or 10b may be washed after the separating to remove any adhering or otherwise residual salt composition 34 on nanoparticles 10a or 10b.

In some examples, the example technique of FIG. 5 may optionally include, after depositing shell 14a or 14b on iron-based core 12a or 12b (44), drying the core-shell nanoparticles 10a or 10b (50). For example, the drying may include oven drying, convection drying, or fluidized drying.

The example technique of FIG. 5 also may optionally include, after depositing shell 14a or 14b on iron-based core 12a or 12b (44), nitriding the core-shell nanoparticles 10a or 10b (52). For example, the nitriding (52) may be performed similar to or substantially the same as nitriding iron-based core 12a or 12b (42). The nitriding may help introduce an iron nitride phase within nanoparticle 10a or 10b, for example, within one or both of core 12a or 12b, or shell 14a or 14b. In some examples, the technique of FIG. 5 includes only one of steps (42) and (52). In other examples, the technique of FIG. 5 includes both of steps (42) and (52). In other examples, such as when core-shell nanoparticles 10a or 10b do not include iron nitride, the technique of FIG. 5 may omit both of steps (42) and (52).

The example technique of FIG. 5 may further optionally include, after depositing shell 14a or 14b on iron-based core 12a or 12b (44), annealing nanoparticles 10a or 10b (54). For example, the annealing may include exposing nanoparticles 10a or 10b to a magnetic field having a predetermined strength at a predetermined temperature for a predetermined period of time. For example, the annealing may include heating the particles to a temperature between about 100° C. and about 250° C., such as between about 120° C. and about 220° C., for example, between about 180° C. and 220° C. The annealing process may continue for a predetermined time that is sufficient to allow diffusion of the nitrogen atoms to the appropriate interstitial spaces in the iron crystal lattice. Such diffusion may promote the formation of iron nitride phases, and may promote the conversion of disordered iron nitride phases, for example, $Fe_8N$, into ordered iron nitride phases, for example, $Fe_{16}N_2$. However, heating at temperatures greater than about 250° C. may reduce the formation of ordered iron nitride phases, or may degrade previously-formed ordered iron nitride phases such as $Fe_{16}N_2$. In some examples, the annealing process continues for between about 20 hours and about 200 hours, such as between about 40 hours and about 60 hours. In some examples, the annealing process may occur under an inert atmosphere, such as Ar, to reduce or substantially prevent oxidation of the iron. Further, in some implementations, the temperature is held substantially constant. The annealing may result in magnetic material including at least one $\alpha''$-$Fe_{16}N_2$ phase domain.

In some examples, the annealing may include exposing nanoparticles 10a or 10b to an external magnetic field during the annealing process. Annealing iron nitride materials in the presence of an applied magnetic field may enhance the $Fe_{16}N_2$ phase domain formation in iron nitride materials. Increased volume fractions of $\alpha''$-$Fe_{16}N_2$ phase domains may improve the magnetic properties of core-shell nanoparticles including iron nitride. Improved magnetic properties may include, for example, coercivity, magnetization, and magnetic orientation.

In some examples, an applied magnetic field during annealing may be at least 0.2 Tesla (T). The temperature at which the magnetic field annealing is performed may at least partially depend upon further elemental additions to the iron nitride base composition and the approach used to initially synthesize the iron nitride base composition. In some examples, the magnetic field may be at least about 0.2 T, at least about 2 T, at least about 2.5 T, at least about 6 T, at least about 7 T, at least about 8 T, at least about 9 T, at least about 10 T, or higher. In some examples, the magnetic field is between about 5 T and about 10 T. In other examples, the magnetic field is between about 8 T and about 10 T. Further details regarding annealing the materials including iron and nitrogen may be found in U.S. Provisional Application No. 62/019,046, filed Jun. 30, 2014, the entire content of which is incorporated herein by reference.

Thus, the example system of FIG. 4 and the example technique of FIG. 5 may be used to form core-shell nanoparticles according to the disclosure. Other example systems and techniques for forming core-shell nanoparticles are described with reference to FIGS. 6-9.

Figure 6:
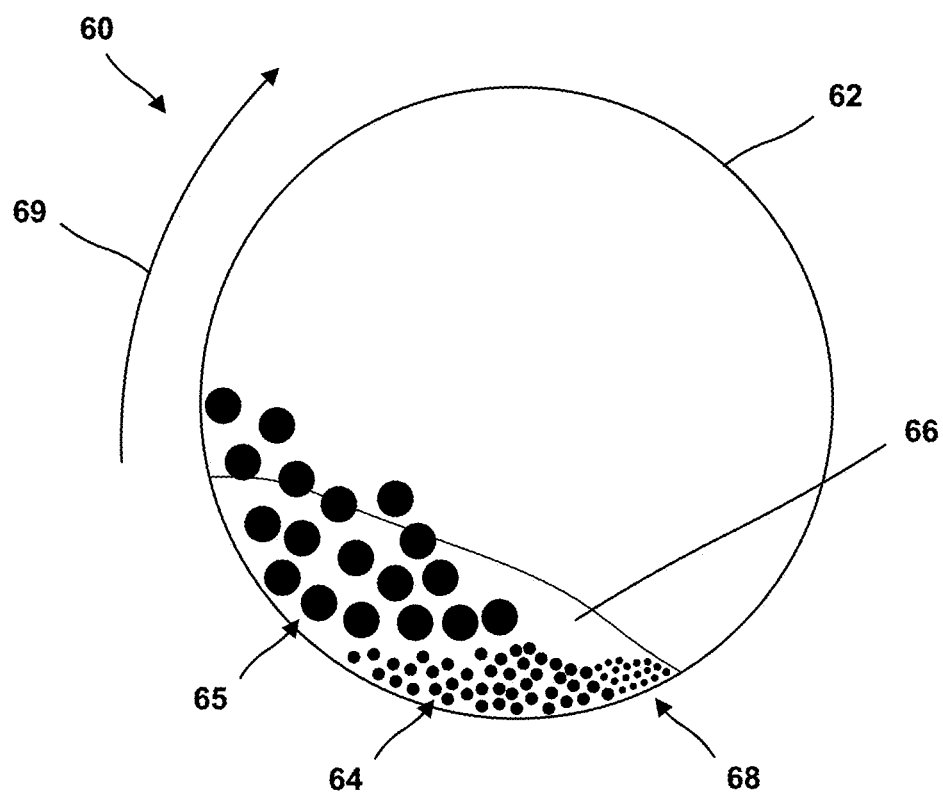
FIG. 6 is a conceptual and schematic diagram illustrating an example milling system for forming a core-shell nanoparticle by milling.

FIG. 6 is a conceptual and schematic diagram illustrating an example milling system 60 for forming example core-shell nanoparticles by milling. Milling system 10 may be operated in a rolling mode, in which a bin 62 of milling system 60 rotates about a horizontal axis of bin 62, as indicated by arrow 69. As bin 62 rotates, milling media 65 (such as milling spheres, milling bars, or the like) move within bin 62 and, over time, crush or wear an iron-containing material 64. In some examples, iron-containing material 64 may include iron-based cores 12a or 12b. In addition to iron-containing material 64 and milling media 65, bin 12 includes a salt composition 66. In some examples, salt composition 66 may include one or more precursors of at least one of silica, aluminum oxide, silicon nitride, aluminum nitride, manganese nitride, zinc oxide, iron oxide, ferromanganese, $Fe_4N$, $Fe_8N$, or $Fe_{16}N_2$. Salt composition 66 deposits respective shells 14a or 14b on iron-based cores 12a or 12b. For example, salt composition 66 may include one or more of a solid, a slurry, a paste, a suspension, a liquid, a solution, a polymer, or a gel.

During the milling, milling media 65 may exert pressure on iron-containing material 64 and salt composition 66, which may result in cold welding of material from salt composition 66 onto iron-containing material 64. For example, in examples in which iron-containing material 64 includes iron-based core 12a or 12b, the milling may result in cold welding of material from salt composition 66 onto iron-based core 12a or 12b, to form a cold welded shell 14a or 14b. The cold welding may thus allow shell 14a or 14b to be deposited on core 12a or 12b, without heating, or without requiring a molten phase of shell material.

In some examples, milling system 60 may include additional components. For example, milling system 60 may include a nitrogen source, for nitriding iron-containing material 64 before, during, or after, depositing shell 14a or 14b on iron-based cores 12a or 12b. In some examples, the nitrogen source may include at least one of ammonia, ammonium nitrate, an amide-containing material, or a hydrazine-containing material. In some examples, the amide-containing material may include at least one of a liquid amide, a solution containing an amide, carbamide, methanamide, benzamide, or acetamide. The hydrazine-containing material may include at least one of a hydrazine or a solution containing the hydrazine. In some examples, salt composition 66 may include the nitrogen source. In some examples, a nitriding composition may include a nitrogen source. In some examples, the nitrogen source may be contained in a dispenser in milling system 60.

In some examples, iron-containing material 64 may include an iron precursor instead of iron-based cores 12a or 12b. For example, the iron precursor may include at least one of iron (Fe), $FeCl_3$, $Fe_2O_3$, or $Fe_3O_4$. Bin 62 may contain a reducing environment, as described elsewhere in the disclosure, and may mill the iron precursor in the reducing environment to form iron-based cores 12a or 12b. In some examples, milling system 60 may mill the iron precursor with the nitrogen source to nitride the iron precursor as iron-based cores 12a or 12b are formed.

In the example illustrated in FIG. 6, milling media 65 may include a sufficiently hard material that, when contacting iron-containing material 64 with sufficient force, will wear iron-containing raw material 64 and cause particles of iron-containing material 64 to, on average, have a smaller size, for example, smaller particles 68. In some examples, milling media 65 may be formed of steel, stainless steel, or the like. In some examples, the material from which milling media 65 are formed may not chemically react with iron-containing material 64 and/or the nitrogen source. In some examples, milling media 65, such as milling spheres, may have an average diameter between about 5 millimeters (mm) and about 20 mm.

To facilitate milling of iron-containing material 64, in some examples, the mass ratio of the total mass of milling media 65 to the total mass of iron-containing material 64 may be between about 1:1 to about 50:1, for example, about 20:1.

Figure 7:
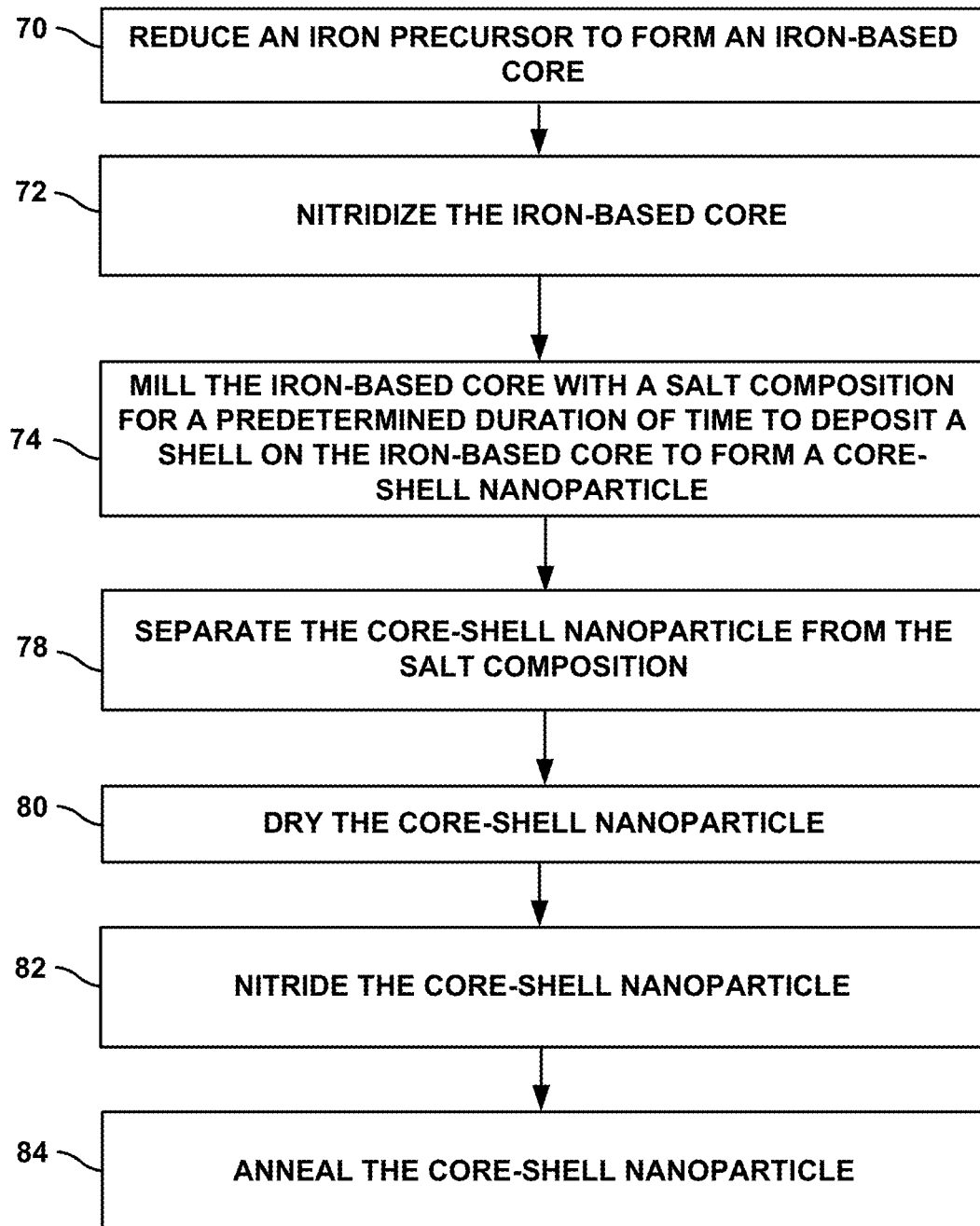
FIG. 7 is a flow diagram illustrating an example technique for forming a core-shell nanoparticle by milling.

In some examples, milling system 60 may be used to perform the example technique of FIG. 7. While the example technique of FIG. 7 is described with reference to components of milling system 60, the example technique of FIG. 7 may be performed with other milling systems. FIG. 7 is a flow diagram illustrating an example technique for forming core-shell nanoparticle 10a or 10b by milling.

In some examples, the technique of FIG. 7 may optionally include reducing an iron precursor to form iron-based cores 12a or 12b (70). In some examples, the reducing 70 may be performed similarly to the reducing 40 described with reference to the example technique of FIG. 5. In some examples, the reducing may be performed by milling system 60. For example, bin 62 may mill iron precursor in a reducing environment, as described elsewhere in the disclosure.

In some examples, the example technique of FIG. 7 may optionally include nitriding iron-based core 12a or 12b (72). In some examples, the nitriding 72 may be performed similarly to the nitriding 42 described with reference to the example technique of FIG. 5. In some examples, the nitriding 72 may be performed using milling system 60.

For example, the nitriding (72) may include milling iron-based core 12a or 12b with a nitrogen source for a predetermined period of time. In some examples, salt composition 66 may include the nitrogen source. In some examples, a nitriding composition in bin 62 may include the nitrogen source. For example, the nitrogen source may be similar to nitrogen sources described elsewhere in the disclosure.

The technique of FIG. 7 includes depositing shell 14a or 14b on iron-based core 12a or 12b, by milling iron-based core 12a or 12b with salt composition 66 for a predetermined period of time (74). For example, bin 62 of milling system 60 may be rotated at a rate sufficient to cause mixing of the components in bin 62 (e.g., milling media 65, iron-containing material 64, the and salt composition 66) and cause milling media 65 to mill iron-containing material 64 and salt composition 66 so as to cause a shell to be deposited from salt composition 66 onto iron-based cores 12a or 12b in iron-containing material 64. In some examples, bin 62 may be rotated at a rotational speed of between about 500 revolutions per minute (rpm) to about 2000 rpm, such as between about 600 rpm and about 650 rpm, about 600 rpm, or about 650 rpm.

In some examples, the depositing 74 may initially include milling iron-based material 64 with one of salt composition 66 or the nitriding composition, and may subsequently include milling iron-based material 64 with the other of salt composition 66 or the nitriding composition. In some examples, the nitriding composition may be introduced into salt composition 66, or bin 62 may be progressively exposed to the nitrogen source, as the depositing 74 progresses. Eventually, nanoparticle 10a or 10b may be formed by respectively depositing shell 14a or 14b on core 12a or 12b.

In some examples, the example technique of FIG. 7 may include, after the depositing 74, separating nanoparticle 10a or 10b from salt composition 66 (78). The separating 78 may be performed similarly to separating 48 described with reference to the example technique of FIG. 5.

In some examples, the example technique of FIG. 7 may include, after the depositing 74, drying the core-shell nanoparticles 10*a* or 10*b* (80). The drying 80 may be performed similarly to the drying 50 described with reference to the example technique of FIG. 5.

In some examples, the example technique of FIG. 7 may include, after the depositing 74, nitriding the core-shell nanoparticles 10*a* or 10*b* (82). The nitriding 82 may be performed similarly to the nitriding 52 described with reference to the example technique of FIG. 5.

In some examples, the example technique of FIG. 7 may include, after the depositing 74, annealing nanoparticles 10*a* or 10*b* (84). The annealing 84 may be performed similarly to the annealing 54 described with reference to the example technique of FIG. 5.

Thus, the example system of FIG. 6 or the example technique of FIG. 7 may be used to form core-shell nanoparticles according to the disclosure. Other example systems and techniques for forming core-shell nanoparticles are described with reference to FIGS. 8 and 9.

Figure 8:
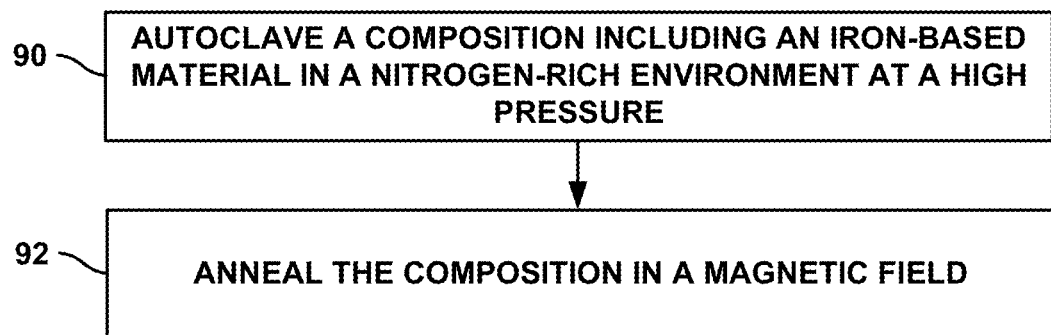
FIG. 8 is a flow diagram illustrating an example technique for treating a composition including an iron-based material.

FIG. 8 is a flow diagram illustrating an example technique for treating a composition including an iron-based material. For example, the example technique of FIG. 8 includes treating a composition including core-shell nanoparticle 10*a* or 10*b*. In some examples, the composition may include any iron-based material, for example, elemental iron, iron nitride, $\alpha''$-$Fe_{16}N_2$, or $\alpha'$-Fe(Co)(N). In some examples, the iron-based material may include iron-based workpieces. For example, workpieces may include grains or powders, such as spheres, cylinders, flecks, flakes, regular polyhedra, irregular polyhedra, and any combination thereof. Examples of suitable regular polyhedra include tetrahedrons, hexahedrons, octahedron, decahedron, dodecahedron and the like, non-limiting examples of which include cubes, prisms, pyramids, and the like. In some examples, workpieces may include a dimension that is longer, e.g., much longer, than other dimensions of the workpiece. Example workpieces with a dimension longer than other dimensions include fibers, wires, filaments, cables, films, thick films, foils, ribbons, sheets, or the like. In other examples, workpieces may not have a dimension that is longer than other dimensions of the workpiece. In some examples, workpieces may include nanoparticles, for example, core-shell nanoparticles. The workpieces may be further processed to form bulk magnets. For example, the workpieces may be sintered, bonded, or both sintered and bonded together directly to form a bulk magnet.

In some examples, the example technique of FIG. 8 includes autoclaving the composition at a predetermined pressure, at a predetermined temperature, for a predetermined period of time, in an environment including a nitrogen source (90). Instead of, or in addition to, autoclaving, the example technique of FIG. 8 may include any suitable high-pressure nitriding step. In some examples, the autoclaving 90 includes heating the composition to a temperature greater than about 200° F. In some examples, the autoclaving 90 includes, simultaneously with the heating, pressurizing the composition to a pressure between about 1 atmospheres and about 100 atmospheres, or greater than 100 atmospheres. The autoclaving 90 nitrides the composition, for example, by introducing an iron nitride phase in one or both of core 12*a* or 12*b* and shell 14*a* or 14*b* of nanoparticle 10*a* or 10*b*. Without wishing to be bound by theory, diffusion of nitrogen species increases with pressure. Increasing the pressure, for example, by autoclaving, increases nitrogen diffusion. Using a pressure of at least about 100 atmospheres may increase the diffusion rate by at least about 10 times. Increasing the diffusion rate may promote the nitriding result, for example, for increasing the rate of iron nitride formation.

In some examples, the example technique of FIG. 8 may include milling the composition with the nitrogen source for a predetermined period of time. The milling may be performed similar to the milling 74 described with reference to FIG. 7.

In some examples, the nitrogen source used in the autoclaving (90) or the milling includes at least one of ammonia, ammonium nitrate, an amide-containing material, or a hydrazine-containing material. In some examples, the amide-containing material includes at least one of a liquid amide, a solution containing an amide, carbamide, methanamide, benzamide, or acetamide. In some examples, the hydrazine-containing material includes at least one of a hydrazine or a solution containing the hydrazine.

In some examples, the example technique of FIG. 8 may optionally include, after the autoclaving (90) or the milling, annealing the deposited iron-based core (92). The annealing 92 may be performed similarly to the annealing 54 described with reference to the example technique of FIG. 5.

Thus, the example technique of FIG. 8 may be used to treat a composition comprising iron-based materials, for example, iron-based workpieces including core-shell nanoparticles, for example, to nitride iron-based materials to introduce an iron nitride phase.

EXAMPLES

Example 1

The coercivity $H_C$ of ellipsoidal particles of $Fe_{16}N_2$ was calculated for varying particle dimensions, using the equation $H_C=H_S(1-P)$. The shape anisotropy $H_S=4\pi \cdot \Delta N \cdot M_S$, where $M_S$ is the saturation magnetization (200 emu/g for $Fe_{16}N_2$). $\Delta N=N_a-N_c$ is the demagnetizing factor difference between longitude and transverse directions of the particles. The packing factor P=0.52 for close simple cubic packed ellipsoids. The coercivity depended on the ratio of the length of the particles (c) to the diameter of the particles (a), as set forth in TABLE 1.

TABLE 1

| c/a | $\Delta N$ | $H_S$(Oe) | $H_C$(Oe) |
| --- | --- | --- | --- |
| 2 | 0.24 | 4524 | 2171 |
| 3 | 0.34 | 6409 | 3076 |
| 7 | 0.45 | 8482 | 4072 |

Example 2

The coercivity $H_C$ of ellipsoidal particles of $Fe_{16}N_2$ including a non-magnetic shell of thickness h was calculated for varying particle dimensions, where a, b, and c are the three ellipsoidal diameters, using the. The packing factor P was calculated using EQUATION 1.

$$P = \frac{\frac{4\pi}{3} \cdot a \cdot b \cdot c}{(2a+2h) \cdot (2b+2h) \cdot (2c+2h)} \quad \text{Equation 1}$$

The coercivity depended on a, b, c, and h, as set forth in TABLE 2.

TABLE 2

| c/a | ΔN | $H_S$ (Oe) | $H_C$ (Oe) | $H_C$ (Oe) a = 60 nm, b = 60 nm, h = 3 nm | $H_C$ (Oe) a = 60 nm, b = 60 nm, h = 6 nm | $H_C$ (Oe) a = 60 nm, b = 60 nm, h = 12 nm | $H_C$ (Oe) a = 60 nm, b = 60 nm, h = 20 nm |
|---|---|---|---|---|---|---|---|
| 2 | 0.24 | 4524 | 2171 | 2429 | 2660 | 3029 | 3382 |
| 3 | 0.34 | 6409 | 3076 | 3416 | 3727 | 4225 | 4710 |
| 7 | 0.45 | 8482 | 4072 | 4484 | 4865 | 5486 | 6099 |

Example 3

Figure 9:
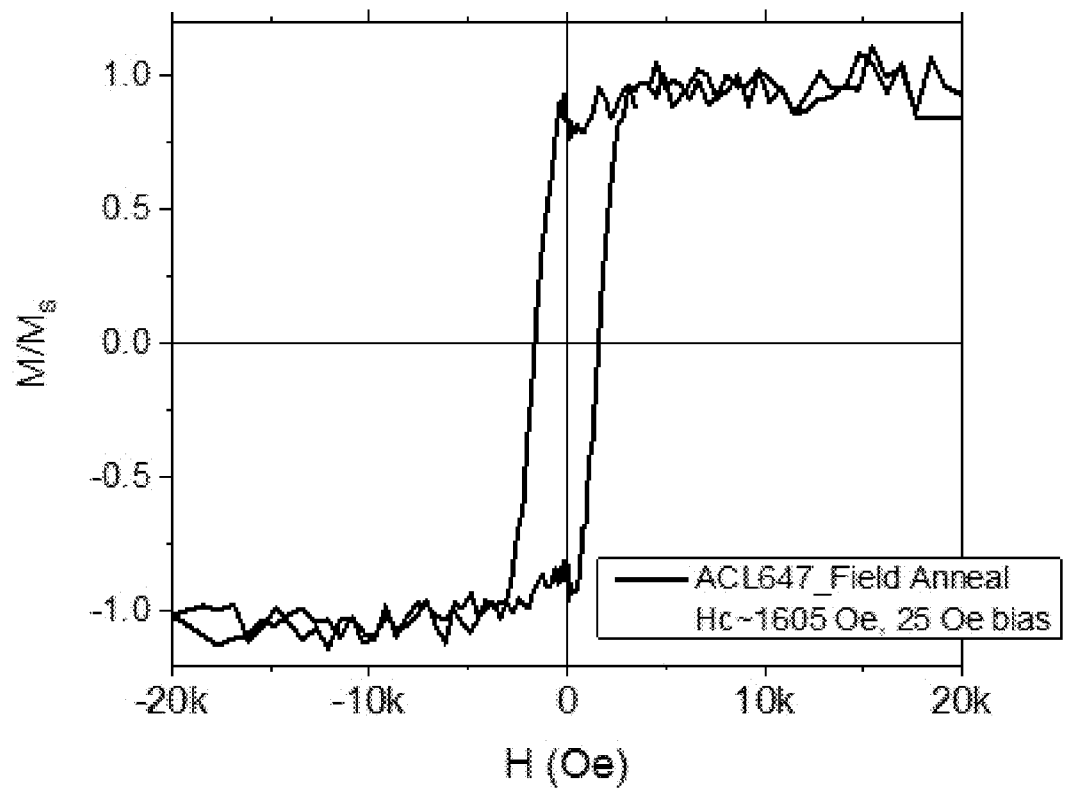
FIG. 9 is a diagram illustrating a hysteresis loop of magnetization versus applied magnetic field at room temperature for example nanoparticles including $Fe_{16}N_2$ cores and MnN shells.

Example core-shell nanoparticles were prepared by sputtering an anti-ferromagnetic MnN shell on ellipsoidal $Fe_{16}N_2$ cores. The magnetization behavior of the example core-shell nanoparticles was studied. FIG. 9 is a diagram illustrating a hysteresis loop of magnetization versus applied magnetic field at room temperature for example nanoparticles including $Fe_{16}N_2$ cores and MnN shells. A relatively high coercivity of about 1605 Oe was achieved.

Example 4

Figure 10:
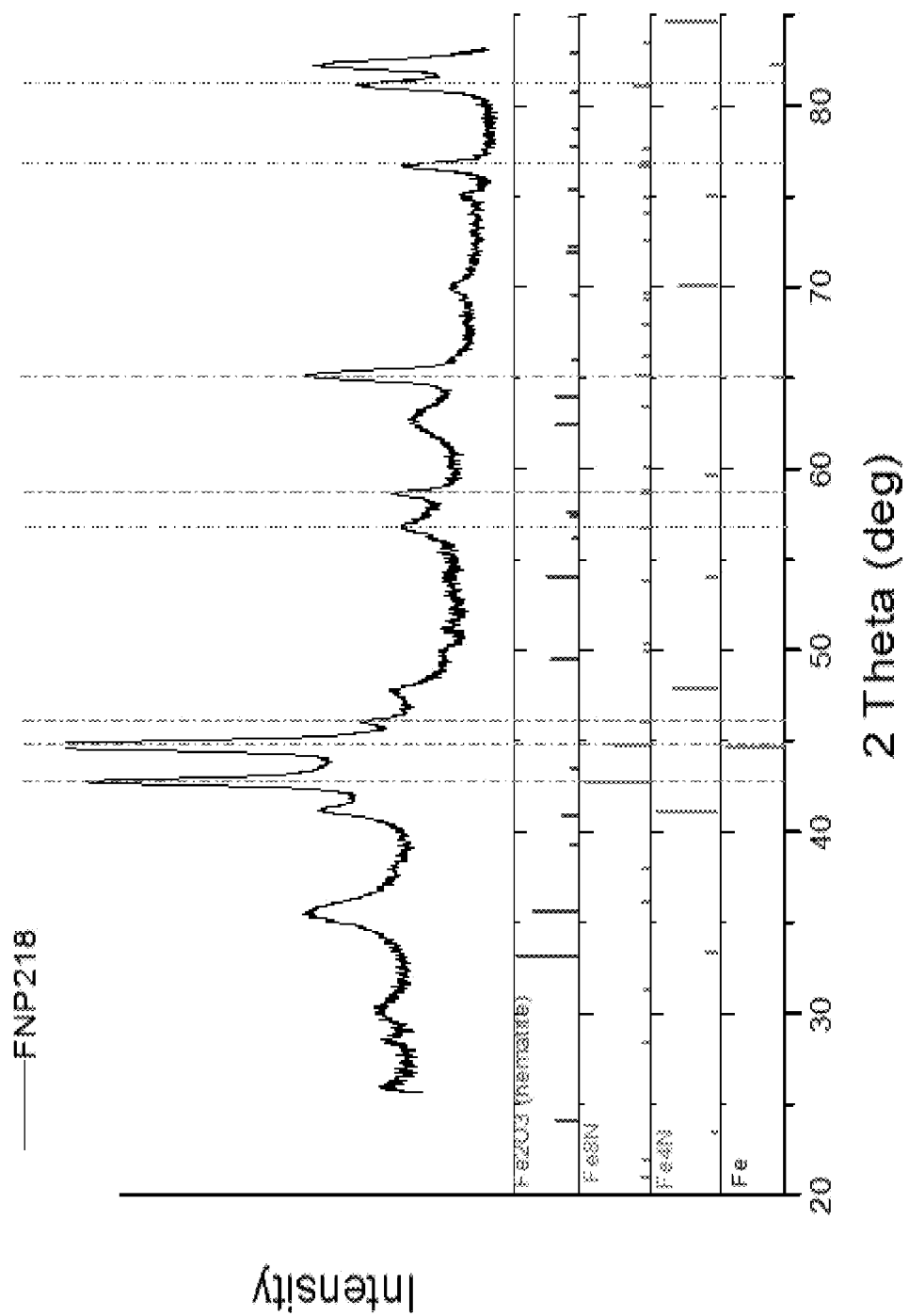
FIG. 10 is a diagram illustrating x-ray diffraction data for example nanoparticles including Fe cores and $Fe_{16}N_2$ shells formed by nitriding Fe nanoparticles.
Figure 11:
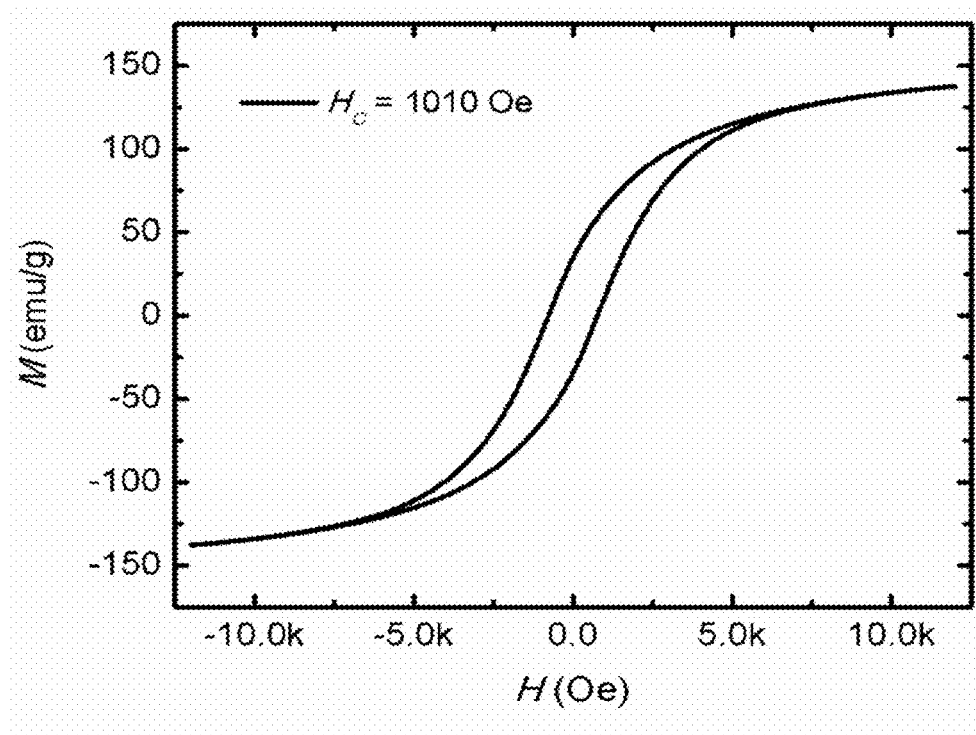
FIG. 11 is a diagram illustrating a hysteresis loop of magnetization versus applied magnetic field at room temperature for the example nanoparticles of FIG. 10.
Figure 12:
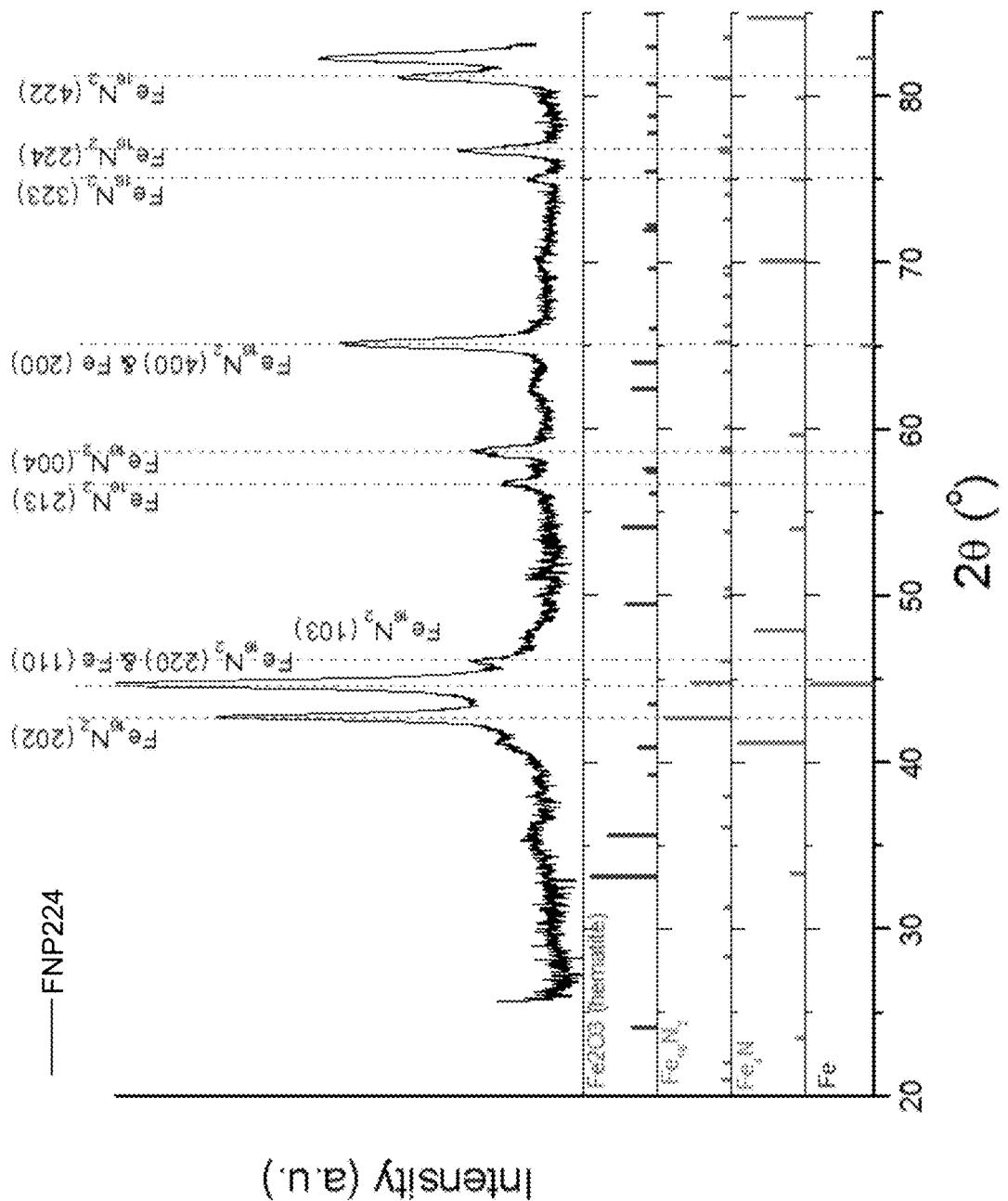
FIG. 12 is a diagram illustrating x-ray diffraction data for example nanoparticles including Fe cores and $Fe_{16}N_2$ shells formed by nitriding Fe nanoparticles.
Figure 13:
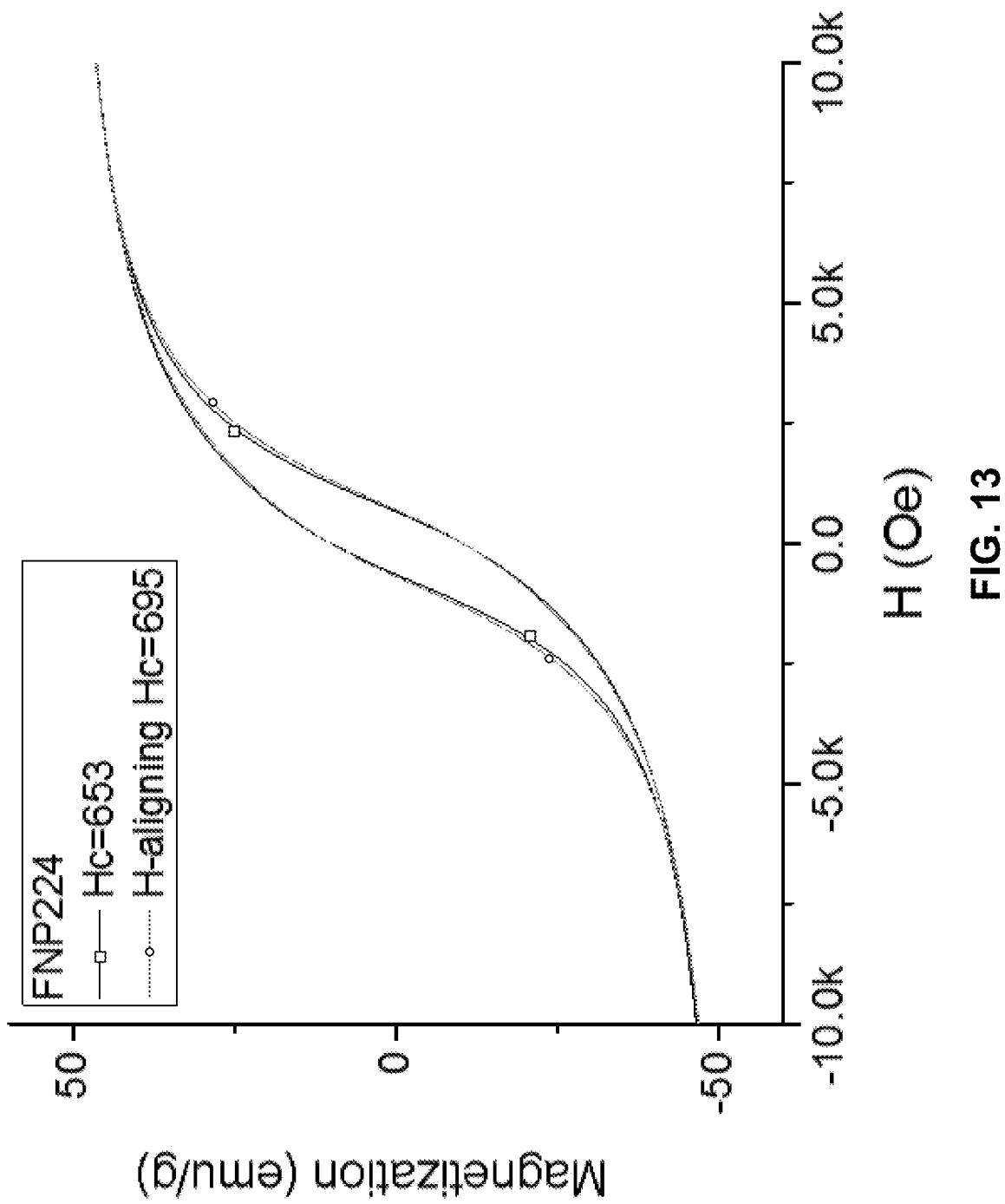
FIG. 13 is a diagram illustrating a hysteresis loop of magnetization versus applied magnetic field at room temperature for the example nanoparticles of FIG. 12.

Example core-shell nanoparticles were prepared by ammonia nitriding ellipsoidal Fe particles. $Fe_{16}N_2$ initially formed as a thin shell at the surfaces of reduced Fe particles, and the thickness of the $Fe_{16}N_2$ increased as a function of nitriding time, to eventually form Fe/$Fe_{16}N_2$ core-shell nanoparticles. FIG. 10 is a diagram illustrating the x-ray diffraction data for the example nanoparticles including Fe cores and $Fe_{16}N_2$ shells, for sample FNP218. The example nanoparticles of FIG. 10 had a ratio $C_{Fe16N2}/C_{Fe}=0.72$. FIG. 11 is a diagram illustrating a hysteresis loop of magnetization versus applied magnetic field at room temperature for the example nanoparticles of FIG. 10. A coercivity of about 1010 Oe and a magnetization saturation of about 150 emu/g were observed. FIG. 12 is a diagram illustrating the x-ray diffraction data for the example nanoparticles including Fe cores and $Fe_{16}N_2$ shells, for sample FNP224, after nitriding for 50 hours using ammonia. FIG. 13 is a diagram illustrating a hysteresis loop of magnetization versus applied magnetic field at room temperature for the example nanoparticles of FIG. 12. A coercivity of about 650 Oe and a magnetization saturation of about 50 emu/g were observed. As shown in FIGS. 10 and 12, the saturation magnetization decreased to about 50 emu/g from about 150 emu/g as the shell was developed into the core.

Example 5

Figure 14:
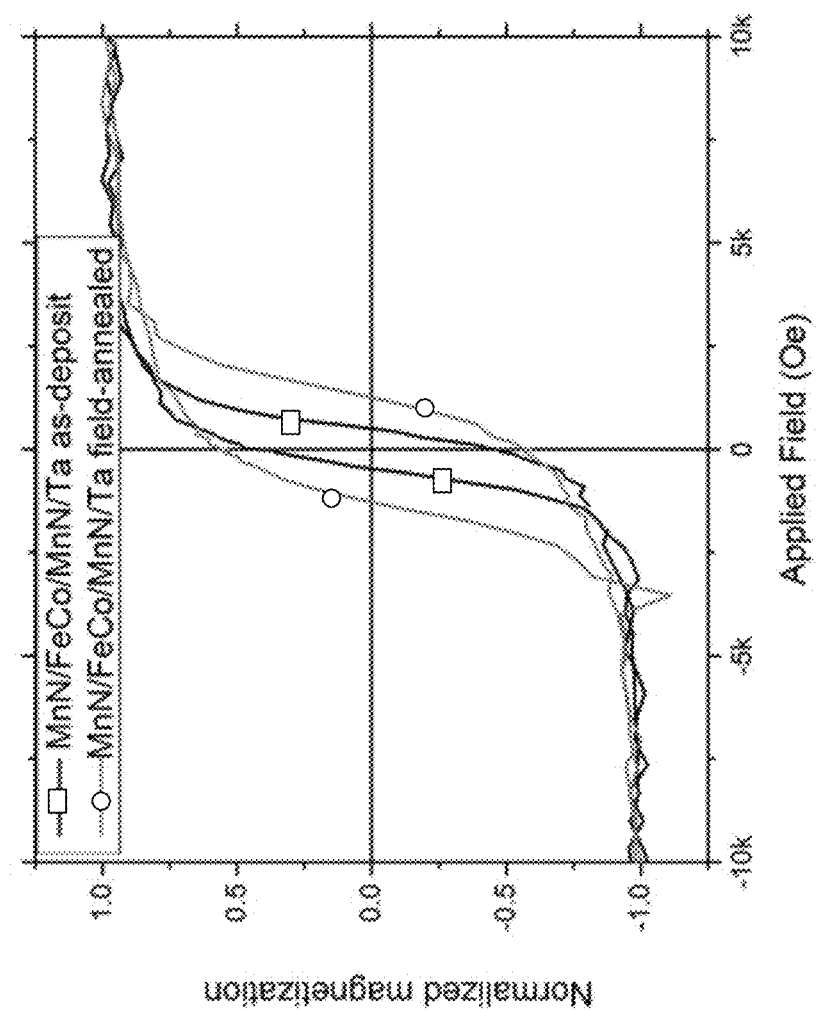
FIG. 14 is a diagram illustrating the effect of field annealing on a hysteresis loop of magnetization versus applied magnetic field at room temperature for example nanoparticles including FeCo cores and MnN shells.

The effect of field annealing on FeCo/MnN core-shell particles, with FeCo cores, and MnN shells, was investigated. The particles were capped with Ta. FIG. 14 is a diagram illustrating the effect of the field annealing on a hysteresis loop of magnetization versus applied magnetic field at room temperature for the example nanoparticles including FeCo cores and MnN shells. Both the coercivity $H_C$ and the saturation magnetization $M_S$ were increased by the annealing, as shown in FIG. 14.

Example 6

Figure 15:
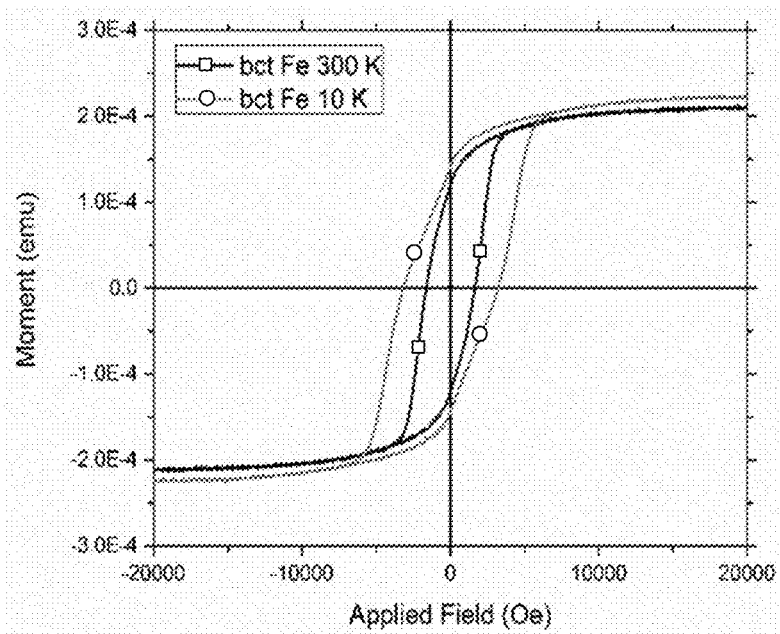
FIG. 15 is a diagram illustrating a hysteresis loop of magnetization versus applied magnetic field at room temperature and a low temperature for example nanoparticles including Fe cores.
Figure 16:
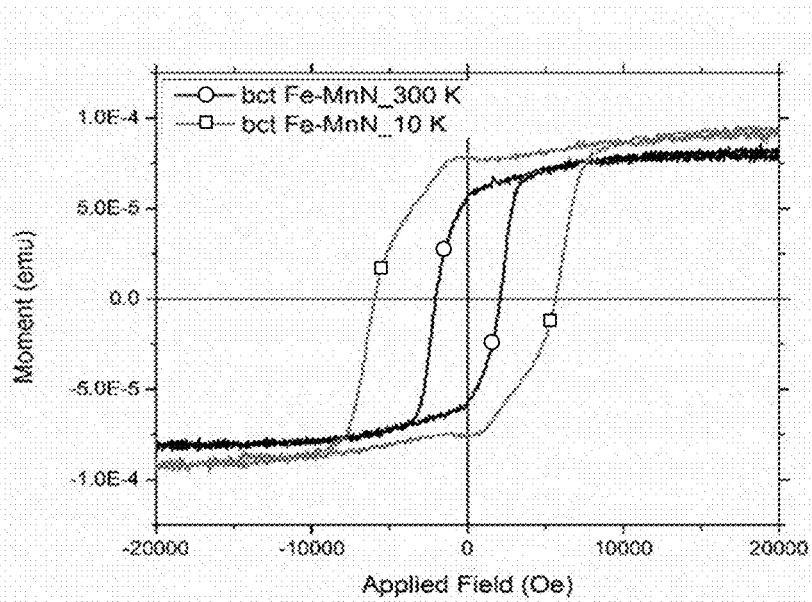
FIG. 16 is a diagram illustrating a hysteresis loop of magnetization versus applied magnetic field at room temperature and at a low temperature for example nanoparticles including Fe cores and MnN shells.

The magnetization behavior of Fe nanoparticles was compared to that of core-shell nanoparticles having Fe cores and MnN shells, at 10K and at 300K. Both kinds of nanoparticles were Ta capped. FIG. 15 is a diagram illustrating a hysteresis loop of magnetization versus applied magnetic field at room temperature (300K) and low temperature (10K) for the example Fe nanoparticles. FIG. 16 is a diagram illustrating a hysteresis loop of magnetization versus applied magnetic field at room temperature (300K) and low temperature (10K) for the example core-shell nanoparticles having Fe cores and MnN shells. As shown in FIGS. 15 and 16, the coercivity increased on using MnN shells.

Various examples have been described. These and other examples are within the scope of the following claims.

What is claimed is:

1. A nanoparticle comprising:
   an iron-based core, wherein the iron-based core comprises a'-Fe(Co)(N); and
   a shell, wherein the shell comprises a non-magnetic material, wherein the non-magnetic material comprises silica, aluminum oxide, silicon nitride, aluminum nitride, or zinc oxide, wherein the shell has a thickness of about 10 nm;
   wherein the nanoparticle has a coercivity of at least about 600 Oe.

2. The nanoparticle of claim 1, wherein the core has a major dimension between about 20 nm and about 100 nm.

3. The nanoparticle of claim 1, wherein the core is an ellipsoid with a ratio of a maximum diameter to a minimum diameter of at least about 2.

4. The nanoparticle of claim 3, wherein the ratio of the maximum diameter to the minimum diameter is at least about 5.

5. The nanoparticle of claim 1, having a coercivity of at least about 1000 Oe.

6. A bulk magnetic material comprising a plurality of the nanoparticles of claim 1.

7. The nanoparticle of claim 1, wherein the core further comprises iron nitride.

8. The nanoparticle of claim 7, wherein the core has a major dimension between about 20 nm and about 100 nm.

9. The nanoparticle of claim 7, having a coercivity of at least about 1000 Oe.

10. A bulk magnetic material comprising a plurality of the nanoparticles of claim 7.

11. The nanoparticle of claim 1, wherein the core further comprises a"-$Fe_{16}N_2$.

12. The nanoparticle of claim 11, wherein the core has a major dimension between about 20 nm and about 100 nm.

13. The nanoparticle of claim 11, having a coercivity of at least about 1000 Oe.

14. A bulk magnetic material comprising a plurality of the nanoparticles of claim 11.

* * * * *